US009482356B2

(12) United States Patent
Seid et al.

(10) Patent No.: US 9,482,356 B2
(45) Date of Patent: Nov. 1, 2016

(54) CONTROL SOLENOID WITH IMPROVED MAGNETIC CIRCUIT

(71) Applicant: Flextronics Automotive, Inc., Milpitas, CA (US)

(72) Inventors: David Seid, Conklin, MI (US); Hamid Najmolhoda, Grand Rapids, MI (US); Klynt Baker, Spring Lake, MI (US); John Kovitz, Walker, MI (US)

(73) Assignee: Flextronics Automotive, Inc., Milpitas, CA (US)

( * ) Notice: Subject to any disclaimer, the term of this patent is extended or adjusted under 35 U.S.C. 154(b) by 0 days.

(21) Appl. No.: 14/474,798

(22) Filed: Sep. 2, 2014

(65) Prior Publication Data

US 2015/0061798 A1    Mar. 5, 2015

Related U.S. Application Data

(60) Provisional application No. 61/872,178, filed on Aug. 30, 2013.

(51) Int. Cl.
| | |
|---|---|
| *H01F 7/13* | (2006.01) |
| *F16K 27/00* | (2006.01) |
| *H01F 7/122* | (2006.01) |
| *H01F 7/16* | (2006.01) |
| *F16K 11/048* | (2006.01) |

(Continued)

(52) U.S. Cl.
CPC .......... *F16K 27/003* (2013.01); *F16K 11/048* (2013.01); *F16K 11/0743* (2013.01); *F16K 31/0603* (2013.01); *F16K 31/0624* (2013.01); *F16K 31/082* (2013.01); *H01F 7/121* (2013.01); *H01F 7/122* (2013.01); *H01F 7/13* (2013.01); *H01F 7/1607* (2013.01); *H01F 7/1615* (2013.01); *H01F 7/1623* (2013.01)

(58) Field of Classification Search
CPC ........ H01F 7/13; H01F 7/122; H01F 7/1623; H01F 7/1615; H01F 7/1646
USPC .................................................. 335/229–234
See application file for complete search history.

(56) References Cited

U.S. PATENT DOCUMENTS

| | | |
|---|---|---|
| 2,255,292 A | 9/1941 | Lincoln |
| 2,512,189 A | 6/1950 | Waterman |

(Continued)

FOREIGN PATENT DOCUMENTS

| | | |
|---|---|---|
| DE | 195 40 580 A1 | 5/1997 |
| DE | 10 2005 038185 A1 | 2/2007 |

(Continued)

*Primary Examiner* — Ramon M Barrera
(74) *Attorney, Agent, or Firm* — Volpe and Koenig, P.C.

(57) ABSTRACT

An electromagnetic solenoid having a coil wound around a bobbin between first and second flanges for generating a magnetic force is disclosed. An armature having an armature flange at a first end is within an interior portion of the tubular center section of the bobbin and is supported for axial displacement between a first position and a second position. A permanent ring magnet is placed at the first end flange with an inner radial face spaced apart from an outer radial face of the armature flange by a radial gap, with the ring magnet supported by a retainer adjacent to the first end flange and fixed against axial displacement with respect to the bobbin. The solenoid comprises an outer case having a closed bottom at a first end and an open top at a second end and a flux washer disposed in the open top adjacent to a second end of the armature.

10 Claims, 8 Drawing Sheets

(51) Int. Cl.
- *F16K 11/074* (2006.01)
- *F16K 31/06* (2006.01)
- *H01F 7/121* (2006.01)
- *F16K 31/08* (2006.01)

(56) References Cited

U.S. PATENT DOCUMENTS

| | | | |
|---|---|---|---|
| 2,522,249 A | 9/1950 | Baker | |
| 2,790,605 A | 4/1957 | Peterson et al. | |
| 2,874,929 A | 2/1959 | Klinger | |
| 2,912,012 A | 11/1959 | Klinger | |
| 2,934,090 A | 4/1960 | Kenann et al. | |
| 3,211,374 A | 10/1965 | Matulaitis | |
| 3,329,165 A | 7/1967 | Lang | |
| 3,351,128 A | 11/1967 | Barnd | |
| 3,525,364 A | 8/1970 | Esche | |
| 3,940,222 A | 2/1976 | Zink | |
| 3,974,998 A | 8/1976 | Wood | |
| 3,989,063 A | 11/1976 | Brouwers et al. | |
| 4,078,579 A | 3/1978 | Bucko, Sr. | |
| 4,193,423 A | 3/1980 | Stoll et al. | |
| 4,285,497 A | 8/1981 | Gottel | |
| 4,641,686 A | 2/1987 | Thompson | |
| 4,807,665 A | 2/1989 | Schiel | |
| 4,852,612 A | 8/1989 | Bucko, Sr. | |
| 4,874,010 A | 10/1989 | DeJong et al. | |
| 5,184,773 A | 2/1993 | Everingham | |
| 5,265,547 A | 11/1993 | Daws | |
| 5,443,241 A | 8/1995 | Odaira et al. | |
| 5,456,286 A | 10/1995 | Warner et al. | |
| 5,564,458 A | 10/1996 | Roth et al. | |
| 5,799,696 A | 9/1998 | Weiss | |
| 5,809,944 A | 9/1998 | Aoki et al. | |
| 5,944,053 A | 8/1999 | Kabierschke et al. | |
| 5,950,576 A | 9/1999 | Busato et al. | |
| 5,979,484 A | 11/1999 | Grando et al. | |
| 6,019,120 A | 2/2000 | Najmolhoda et al. | |
| 6,109,300 A | 8/2000 | Najmolhoda | |
| 6,109,301 A | 8/2000 | Pfetzer | |
| 6,109,302 A | 8/2000 | Bircann | |
| 6,196,167 B1 | 3/2001 | Marsh et al. | |
| 6,588,442 B2 | 7/2003 | Babin | |
| 6,644,352 B1 | 11/2003 | Pfetzer | |
| 6,712,093 B2 | 3/2004 | Hess et al. | |
| 6,814,102 B2 | 11/2004 | Hess et al. | |
| 6,830,067 B2 | 12/2004 | Hayashi | |
| 6,955,141 B2 | 10/2005 | Santanam et al. | |
| 6,955,188 B2 | 10/2005 | Heckt | |
| 7,182,101 B2 | 2/2007 | Alacqua et al. | |
| 7,216,697 B2 | 5/2007 | Odeskog et al. | |
| 8,127,791 B2 * | 3/2012 | Najmolhoda | F16K 31/062 137/596.17 |
| 2002/0084068 A1 | 7/2002 | Hugger | |
| 2003/0150498 A1 | 8/2003 | Williams | |
| 2003/0217775 A1 | 11/2003 | Cousineau et al. | |
| 2004/0182455 A1 | 9/2004 | Wells et al. | |
| 2009/0114865 A1 | 5/2009 | Homann et al. | |
| 2011/0024513 A1 | 2/2011 | Davidson | |
| 2011/0073285 A1 | 3/2011 | Benoit et al. | |
| 2011/0132483 A1 | 6/2011 | Kim et al. | |
| 2012/0048411 A1 | 3/2012 | Steyer et al. | |

FOREIGN PATENT DOCUMENTS

| | | |
|---|---|---|
| DE | 20 2011 107875 U1 | 2/2012 |
| EP | 0 288 045 A2 | 10/1988 |
| EP | 1 801 477 A2 | 6/2007 |

\* cited by examiner

CONTROL SOLENOID WITH IMPROVED MAGNETIC CIRCUIT

CROSS REFERENCE TO RELATED APPLICATIONS

This application claims the benefit of U.S. Patent Application No. 61/872,178 filed on Aug. 30, 2013 which is incorporated by reference as if fully set forth.

FIELD OF INVENTION

Embodiments of the present invention generally relate to electromagnetic solenoids and electromagnetic solenoid valves.

BACKGROUND

Known solenoids include a magnetic coil coiled around a bobbin, a stationary pole piece, sometimes known as a core, axially aligned with, and at least partially within the bobbin, and an armature axially aligned within the bobbin and movable between a first position and a second position relative to the core in response to an electrical current applied to the coil. Separating an end face of the core and an end face of the armature is an air gap proportional to the maximum stroke of the solenoid.

When an electrical current is applied to the coil, a magnetic flux path is created which at some point travels across the air gap separating the armature and the core. The strength of the magnetic flux field directly affects the force with which the armature is displaced. Typically, the magnetic flux generated is reduced because of the air gap. The greater the gap, the greater the reduction in the magnetic force. Similarly, the smaller the air gap, the greater the magnetic force.

As the armature moves, the distance between the end surfaces of the core and armature (i.e., the air gap) varies leading to a variable magnetic flux as the armature moves. The performance of the solenoid is affected by the varying flux field in unpredictable in unrepeatable ways. In particular, the force applied by the armature varies with position of the armature in the stroke, even with a constant electrical current applied to the coil.

In some applications, it is desirable to maintain a constant, or near constant, force of the armature at a selected current. Current solenoids cannot achieve this goal because of the varying air gap.

It is often desirable to manufacture solenoids that produce a consistent armature force within a tight tolerance. Accordingly, solenoids that can be easily adjusted, or fine-tuned, to produce a consistent armature force are desirable for many applications.

With decreased available space for various mechanical components, for example solenoids in automotive transmissions, it is often desirable to limit the size of solenoids while maintaining the desirable functions of the solenoid.

Accordingly, a need exists for a compact solenoid that can easily be manufactured to maintain a constant, or near constant, armature force along the stoke length of the armature under a constant electrical current.

SUMMARY

Embodiments of compact solenoids with improved consistency of armature force are provided herein. In some embodiments, an electromagnetic solenoid comprises a coil for generating a magnetic force when energized with an electric current. The coil includes a bobbin having a tubular center section and first and second end flanges between which the coil is wound. An armature having an armature flange at a first end is disposed at least partially within an interior portion of the tubular center section of the bobbin and is supported for axial displacement between a first position and a second position. A permanent ring magnet is disposed at the first end flange with an inner radial face radially spaced apart from an outer radial face of the armature flange by a radial gap, with the ring magnet supported by a retainer adjacent to the first end flange and fixed against axial displacement with respect to the bobbin. The solenoid comprises an outer case having a closed bottom at a first end and an open top at a second end and a flux washer disposed in the open top adjacent to a second end of the armature.

Other and further embodiments of the present invention are described below.

BRIEF DESCRIPTION OF THE DRAWINGS

Embodiments of the present invention, briefly summarized above and discussed in greater detail below, can be understood by reference to the illustrative embodiments of the invention depicted in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common in the figures. The figures are not drawn to scale and may be simplified for clarity. It is contemplated that elements and features of one embodiment may be beneficially incorporated in other embodiments without further recitation.

While embodiments may be described in reference to an automotive transmission, the presently disclosed solenoid may be modified for a variety of applications while remaining within the spirit and scope of the claimed invention, since the range of the potential applications is great, and because it is intended that the present invention be adaptable to many such variations.

DETAILED DESCRIPTION

Figure 1:
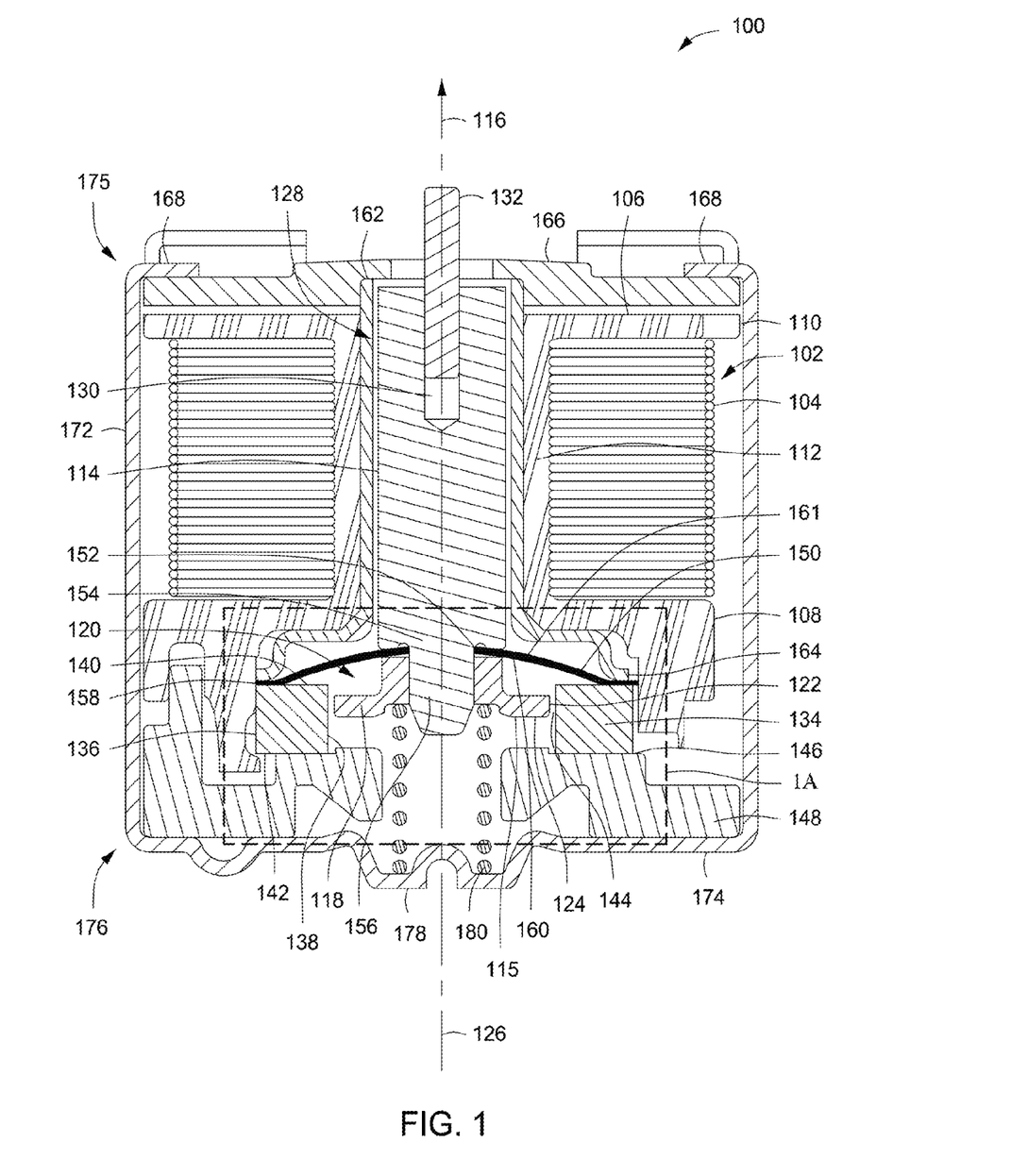
FIG. 1 is a side sectional view of a solenoid in accordance with an embodiment of the present invention.
Figure 1A:
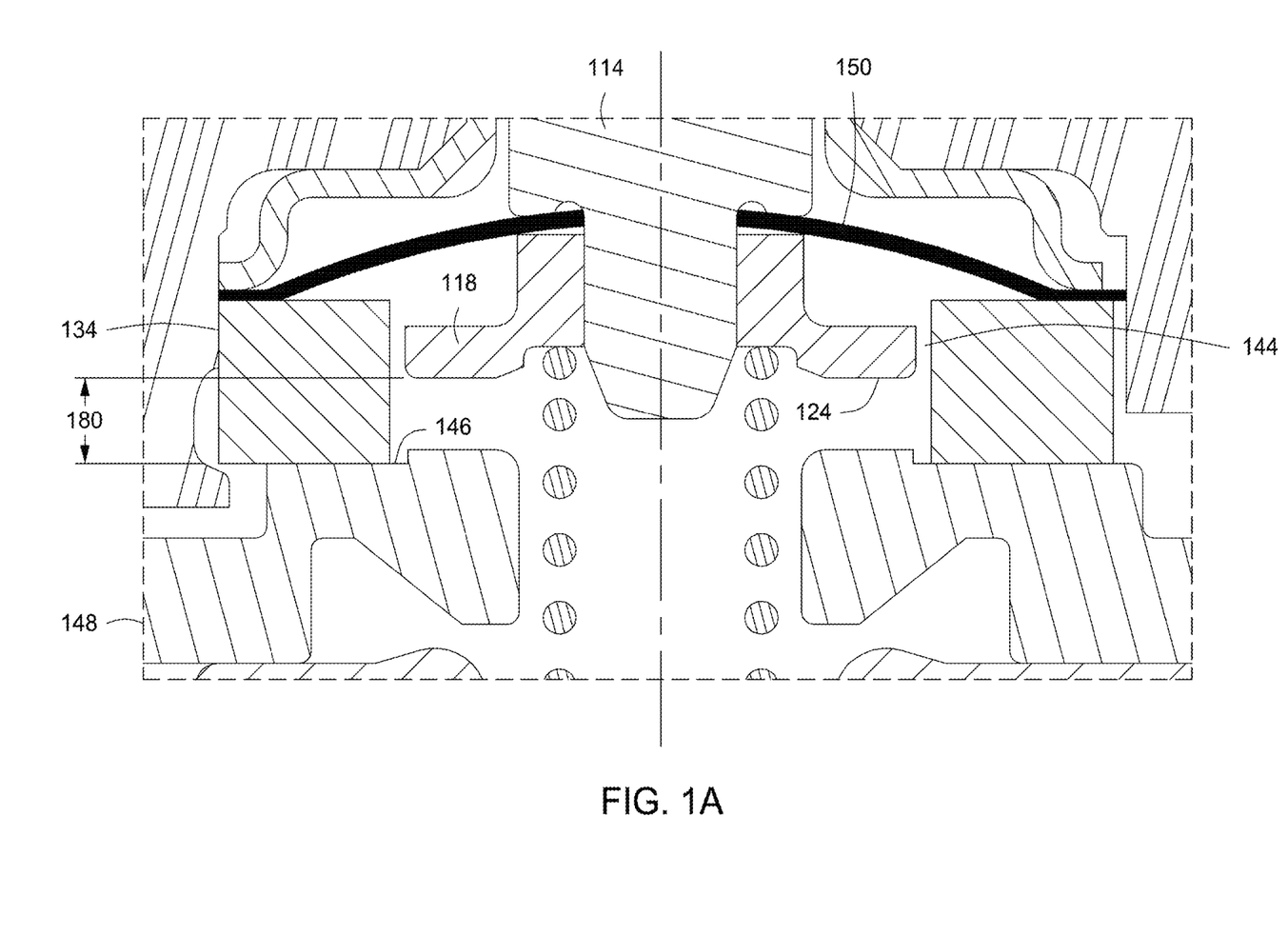
FIG. 1A is an enlarged view of the area of FIG. 1 bounded in dashed lines IA.

FIGS. 1 and 1A depict an electromagnetic solenoid 100 in accordance with an embodiment of the present invention. The solenoid 100 has a magnetic coil 102 formed from ferromagnetic coil windings 104 wound about the tubular center section 112 of a non-magnetic bobbin 106 between a first end flange 108 and a second end flange 110. The coil windings 106 are connected to a controllable electric current supply (not shown). When a non-zero current is directed through the coil 102, that is the coil is energized, a magnetic field is generated around the coil 102. The flux lines of the field radiate around the outside of the coil 102 and concentrate in the hollow core of the coil 102.

A cylindrical armature 114 of magnetic material is disposed at least partially within the hollow of the tubular center section 112 of the bobbin 106 and supported for axial displacement between at least a first position (shown) and a second position. The first and second positions of the armature 114 correspond to a first electric current and a second electric current applied to the coil windings 104. For example, the first position of the armature 114 as shown in FIG. 1 corresponds to a current of zero amperes applied to the coil windings 104. When a non-zero current is applied to the coil windings 104, the magnetic field urges the armature 114 in an upward direction as drawn and indicated by arrow 116. The force with which the armature 114 is displaced is proportional to the magnitude of the current applied by the coil 102, and depends, at least in part, on the magnetic efficiency of the solenoid 100. The magnetic efficiency is influenced by, among other factors, the number of coils 104, the length of the flow path, the number and size of air gaps, and the characteristics of the material from which the solenoid 100 is made.

The armature 114 includes an armature flange 118 at a first end 120. In the non-limiting embodiment shown in FIG. 1, the armature flange 118 is formed separately from the armature 114 as an armature disk 115 and permanently or removably affixed to the first end 120, for example by press fitting. The integrally or separately formed armature flange comprises an outer radial face 122 and a planar bottom face 124 substantially perpendicular to the axis 126 of the armature 114.

In the embodiment of FIG. 1, the second 128 end of the armature 114 includes a bore 130 formed at least partially through the length of the armature 114. The bore 130 may be centrally located and aligned with the armature axis 126. A pin 132 is disposed at least partially within the bore 130 and fixed against axial displacement with respect to the armature 114. For example, the pin 132 may be press fit into the bore 130.

An axially magnetized permanent ring magnet, magnet 134, is disposed at the first end flange 108 of the bobbin 106. The magnet 134 has an outer radial face 136, an inner radial face 138, a top planar surface 140 and a bottom planar surface 142. The bottom planar surface 142 of the magnet 134 rests upon and is supported by a planar ledge 146 of a retainer 148. The retainer 148 is coupled to a portion of the bobbin 106 to fix the axial position of the magnet 134 with respect to the bobbin 108. The magnet 134 is disposed so that the inner radial face 138 is spaced apart from the armature flange 118 by a gap 144.

A positioning disk spring 150 is provided to position the first end 120 of the armature 114. The disk spring 150 has an inner circumferential edge 152 circumscribing and defining a central passage 154 sized and shaped to receive a portion of the first end 120 of the armature 114. In the embodiment of FIG. 1, the first end 120 has a reduced diameter portion 156 that is received in the central passage 154 of the disk spring 150, coupling the disk spring 150 to the armature 114. A separately formed armature flange 118 is affixed to the reduced diameter portion 156, for example by press fit, to secure the disk spring 150 in position against axial or radial displacement with respect to the armature 114.

As illustrated in FIG. 1, a portion of the underside 160 of the disk spring 150 at the outer edge 158 rests upon the top planer surface 140 of the ring magnet 134, fixing the outer edge 158 of the disk spring 150 against downward (as drawn) axial displacement.

The top surface 161 of the disk spring 150 abuts a lower edge 164 of the non-magnetic coil liner 162, fixing the disk spring 150 against upward (as drawn) axial displacement. In the embodiment illustrated, the coil liner 162 has a stepped tubular construction with an upper portion disposed between the tubular center section 112 of the bobbin 106 and the armature 114 with the upper end extending beyond the second end flange 110. The lower portion of the coil liner 162 is radially larger that the upper portion and has a lateral surface abutting a lateral portion of the first end flange 108, preventing upward (as drawn) axial displacement of the coil liner 162 with respect to the bobbin 106. The lower portion is sized to rest upon the top surface 161 of the disk spring 150, preventing axial displacement of the disk spring 150 in an upward direction as drawn.

The upper portion of the coil liner 162 abuts a flux washer 166 held in place against the coil liner 162 by a plurality of malleable tabs 168 formed at a second end 175 of the outer case 172. The tabs 168 are formed so that when shaped, the tabs engage the outer surface of the flux washer to maintain contact with and axially compress, the coil liner 162. The outer case 172 and the flux washer 166 are formed from magnetic materials and provide a portion of the flux path when the coil windings 104 are energized by a command current.

The outer case 172 has a closed bottom 174 formed at a first end 176 and an open top at the second end 175. The closed bottom 174 is formed with a centrally located spring retainer 178 supporting a first, lower, end of a resilient member 180, for example a coil spring. The second end of the resilient member 180 abuts the first end 120 of the armature, for example the bottom face 124 of the armature flange 118.

The retainer 148, the first end flange 108, the ring magnet 134 and the coil liner 162 cooperate to fix the position of the disk spring 150 radially while allowing axial deflection of the circumferential edge 152 of the disk spring 150 in response to axial displacement of the armature 114. The axis 126 of the armature 114 is thus maintained in alignment with the axis of the ring magnet 134 so the gap 144 remains uniform (constant) as the armature 114 is axially displaced.

Figure 2:
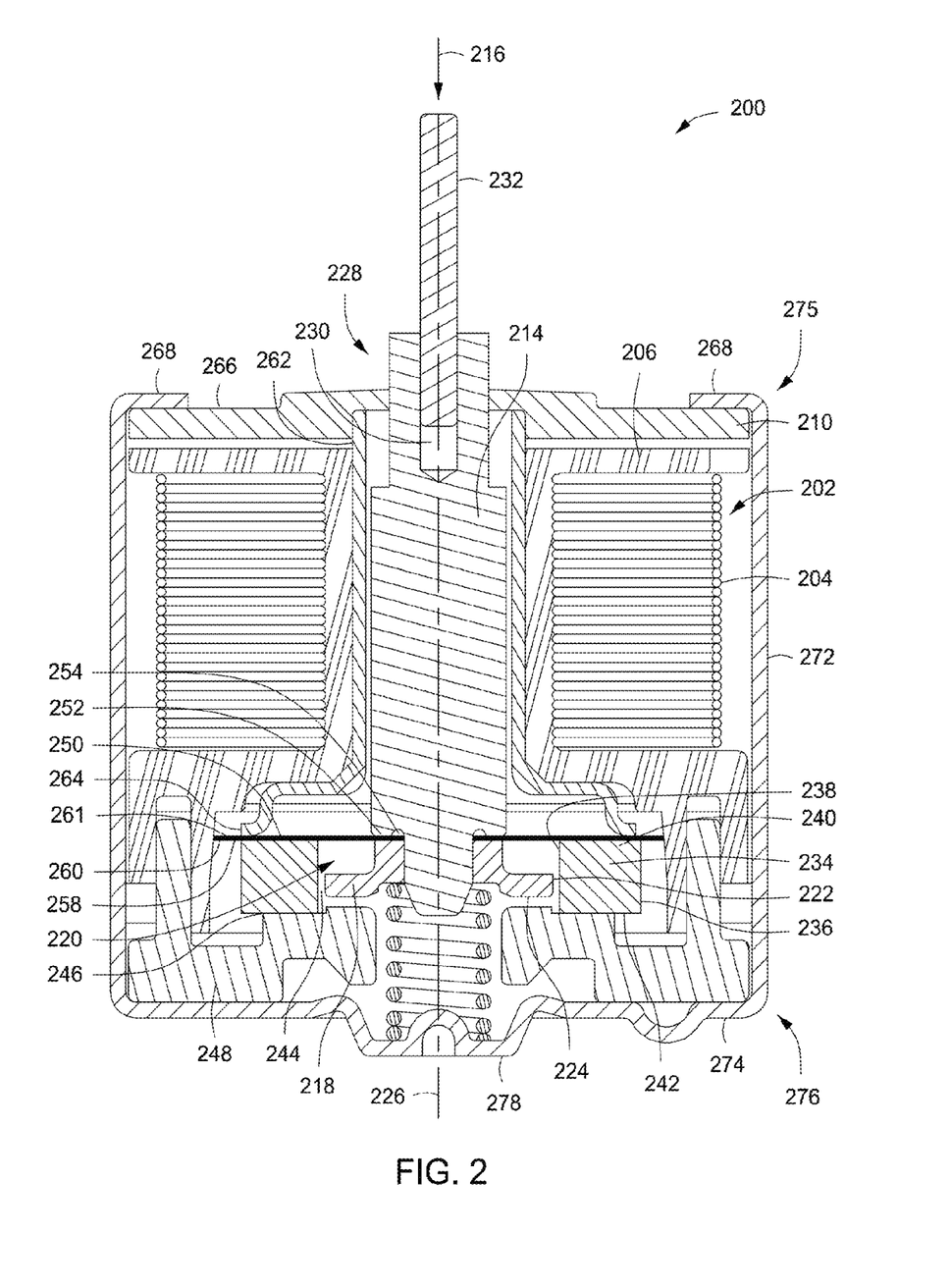
FIG. 2 is a solenoid in accordance with an embodiment of the present invention.

The construction of the presently disclosed solenoid 100 may provide enhanced control pressure of the armature for a given command current in normally low solenoids (as shown in FIG. 1) or normally high solenoids (as shown in FIG. 2 discussed below). For purposes of this disclosure, the armature in a normally low solenoid produces the maximum control pressure when the coil is energized and the armature in a normally high solenoid produces the maximum control pressure when the coil is de-energized. The solenoid illustrated in FIG. 1 is a normally low solenoid. In contrast, the solenoid illustrated in FIG. 2 is a normally high solenoid, sharing many parts with common functionality with the normally low solenoid of FIG. 1. The reference numerals used in FIG. 2 correspond with those used in FIG. 1 and the related text.

FIG. 2 depicts an electromagnetic solenoid 200 in accordance with an embodiment of the present invention. The solenoid 200 has a magnetic coil 202 and ferromagnetic coil windings 204 wound about the tubular center section 212 of a non-magnetic bobbin 206 between first and second end flanges 208 and 210. When the coil is energized by a non-zero current directed through the coil 202, a magnetic field is generated around the coil 202.

A magnetic cylindrical armature 214 is disposed at least partially within the tubular center section 212 of the bobbin 206 and supported for axial displacement between at least a first position (shown) and a second position, corresponding to a first electric current of zero amperes and a second, non-zero electric current, applied to the coil windings 204. When a non-zero current is applied to the coil windings 204, the magnetic field urges the armature 214 in a downward direction as drawn and indicated by arrow 216. The force with which the armature 214 is displaced is proportional to the magnitude of the current applied to the coil 202 and at least partially dependent on the magnetic efficiency as discussed above.

Similar to the embodiment of FIG. 1, the armature 214 includes an armature flange 218 at a first end 220. In the non-limiting embodiment shown in FIG. 2, the armature flange 218 is formed separately from the armature 214 as an armature disk 215 and permanently or removably affixed to the first end 220, for example by press fitting. The integrally or separately formed armature flange comprises an outer radial face 222 and a planar bottom face 224 substantially perpendicular to the axis 226 of the armature 214.

In the embodiment of FIG. 2, the second end 228 of the armature 214 includes a bore 230 formed at least partially through the length of the armature 214 aligned with the armature axis 226 and a pin 232 disposed at least partially within the bore 230. The pin 230 is fixed against axial displacement with respect to the armature 214, for example, the pin 232 may be press fit into the bore 230.

An axially magnetized permanent ring magnet, magnet 234, is disposed at the first end flange 208 of the bobbin 206. The magnet 234 has an outer radial face 236, an inner radial face 238, atop planar surface 240 and a bottom planar surface 242. The bottom planar surface 242 of the magnet 234 rests upon and is supported by a planar ledge 246 of a retainer 248, coupled to a portion of the bobbin 206 to fix the axial position of the magnet 234 with respect to the bobbin 208. The magnet 238 is disposed so that the inner radial face 238 is spaced apart from the armature flange 218 by a gap 244.

A positioning disk spring 250 has an inner circumferential edge 252 circumscribing and defining a central passage 254 sized and shaped to receive a portion of the first end 220 of the armature 214. As illustrated in FIG. 2, a separately formed armature flange 218 is affixed to a reduced diameter portion 256 of the armature 214, for example by press fit, to secure the disk spring 250 in position against axial or radial displacement with respect to the armature 214.

A portion of the underside 260 of the disk spring 250 at the outer edge 258 rests upon the top planer surface 240 of the ring magnet 234, fixing the outer edge 258 against downward (as drawn) axial displacement.

The top surface 261 of the disk spring 250 abuts a lower edge 264 of the non-magnetic coil liner 262 (similar to the embodiment of FIG. 1 as discussed above) fixing the disk spring 250 against upward (as drawn) axial displacement. The coil liner 262 has a stepped tubular construction, with an upper portion disposed between the tubular center section 212 and the armature 214 and the upper end extending beyond the second end flange 210. The lower portion of the coil liner 262 is radially larger that the upper portion and has a lateral surface abutting a lateral portion of the first end flange 208, preventing upward (as drawn) axial displacement of the coil liner 262 with respect to the bobbin 206. The lower portion is sized to rest upon the top surface 261 of the disk spring 250, preventing axial displacement of the disk spring 250 in an upward direction as drawn.

The upper portion of the coil liner 262 abuts a flux washer 266 held in place against the coil liner 262 by a plurality of malleable tabs 268 formed at a second end 275 of the outer case 272 as discussed above. The outer case 272 and the flux washer 266 are formed from magnetic materials and provide a portion of the flux path.

The outer case 272 has a closed bottom 274 formed at a first end 276 and an open top at the second end 275. The closed bottom 274 has a spring retainer 278 supporting a first end of a resilient member 280. The second and of the resilient member 280 abuts the bottom face 224 of the armature flange 218.

The retainer 248, the first end flange 208, the ring magnet 234 and the coil liner 262 cooperate to fix the position of the disk spring 250 radially while allowing axial deflection of the circumferential edge 252 of the disk spring 250 in response to axial displacement of the armature 214. The axis 226 of the armature 214 is thus maintained in alignment with the axis of the ring magnet 234 so the gap 244 remains uniform (constant) as the armature 214 is axially displaced.

The inventors have noted that the disclosed solenoid achieves predictable control pressure over currently known solenoids. Not wishing to be bound by theory, the inventors understand the benefits realized in the present invention result from the constant air gap 144/244 in the present configuration.

Figure 3:
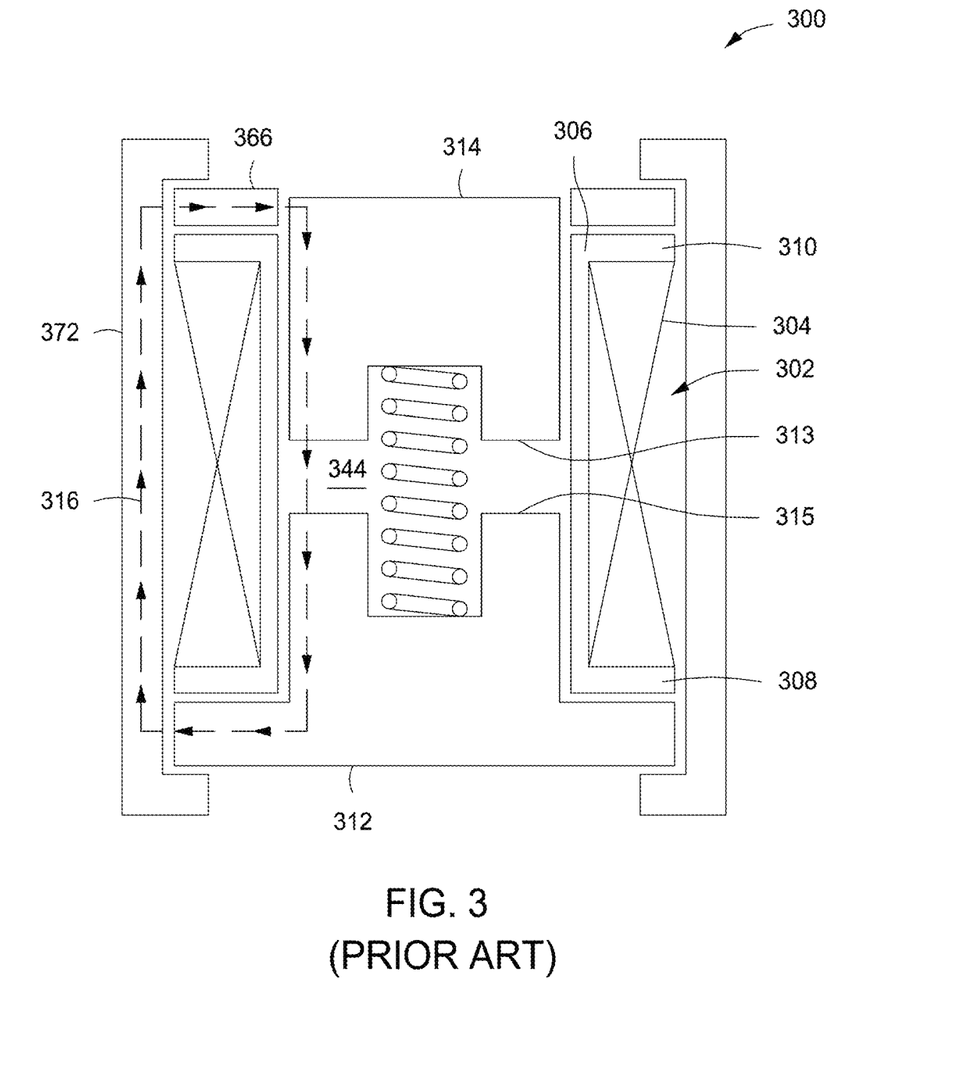
FIG. 3 depicts a typical solenoid valve.

A typical normally high solenoid 300 is shown schematically in FIG. 3. The construction includes a coil 302 with coil windings 304 wound around a tubular bobbin 306 between end flanges 308 and 310. A stationary pole piece or core 312 is partially disposed inside one end of the bobbin 306. An armature 314 is at least partially disposed inside the other end of the bobbin, spaced apart from the core 312 by an air gap 344 and supported for axial displacement within the tubular bobbin 306. An outer case 372 engages the core 312 and a flux washer 366 to contain the components while also providing a portion of the flux path when the coil 302 is energized. A portion of the flux path is shown with arrows 316 travelling across the air gap 344.

However, the axial spacing of the opposing faces 313, 315 of the core and the armature, respectively, varies as the armature is displaced axially. Accordingly, the air gap 344 is not constant during axial displacement of the armature 314. Axial displacement of the armature 314 causes the air gap to vary and has been shown to be proportional to the command current applied to the coil 302.

Figure 4A:
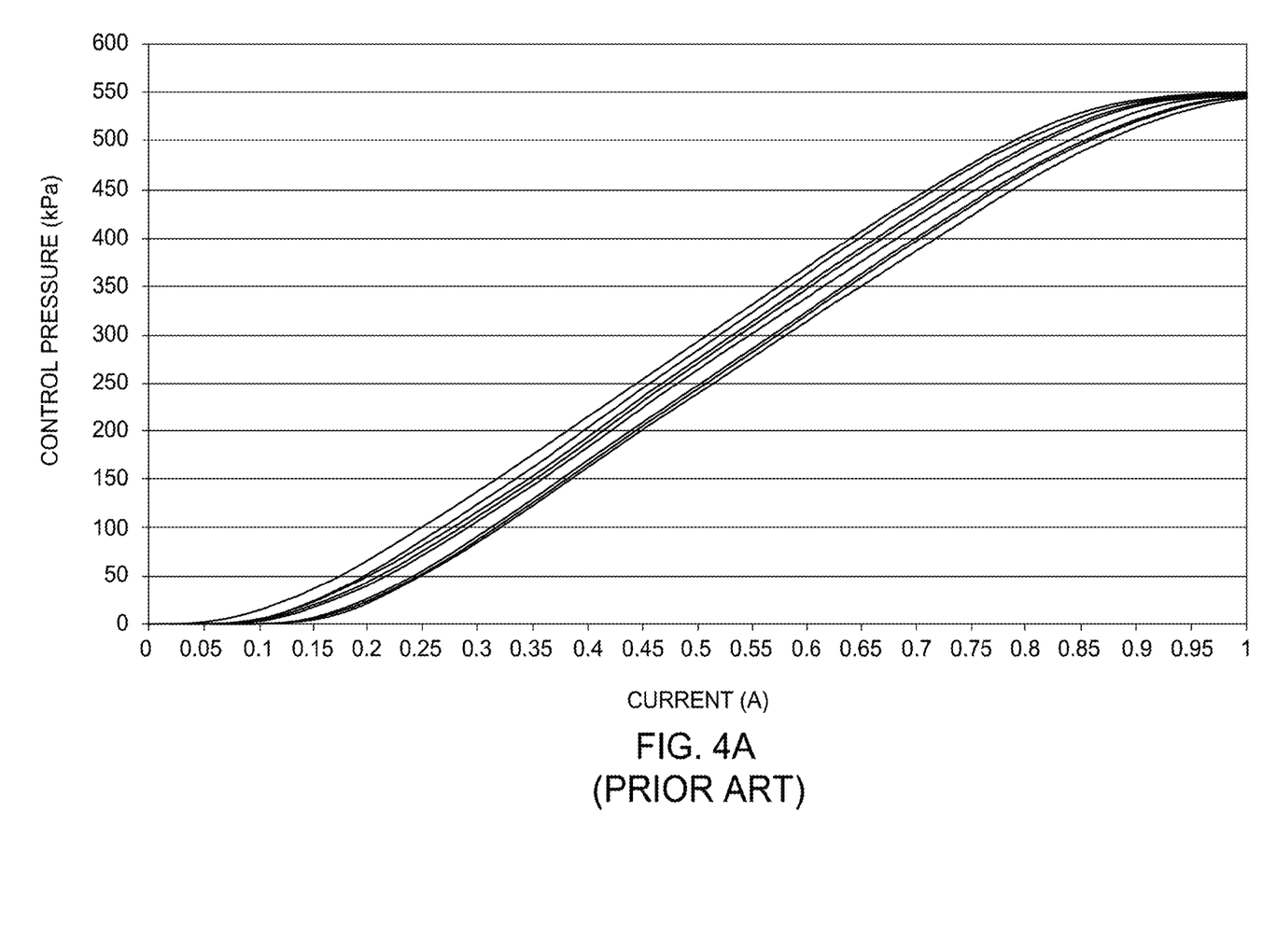
FIG. 4A is a representative plot of control pressure versus command current for a typical normally low solenoid.

The inventors have observed significant operational variations in control pressure exerted by the armature in known solenoids at a constant command current. FIG. 4A is a representative plot of control pressure versus command current (current) for a typical normally low solenoid. Each line represents the pressure curve of the armature at a given command current for the solenoid. At a representative current of 0.5 A, the control pressure varies from about 250 kPa to about 300 kPa, for a variation in control pressure of approximately 50 kPa. In many applications, a variation of this magnitude is unacceptable.

Figure 4B:
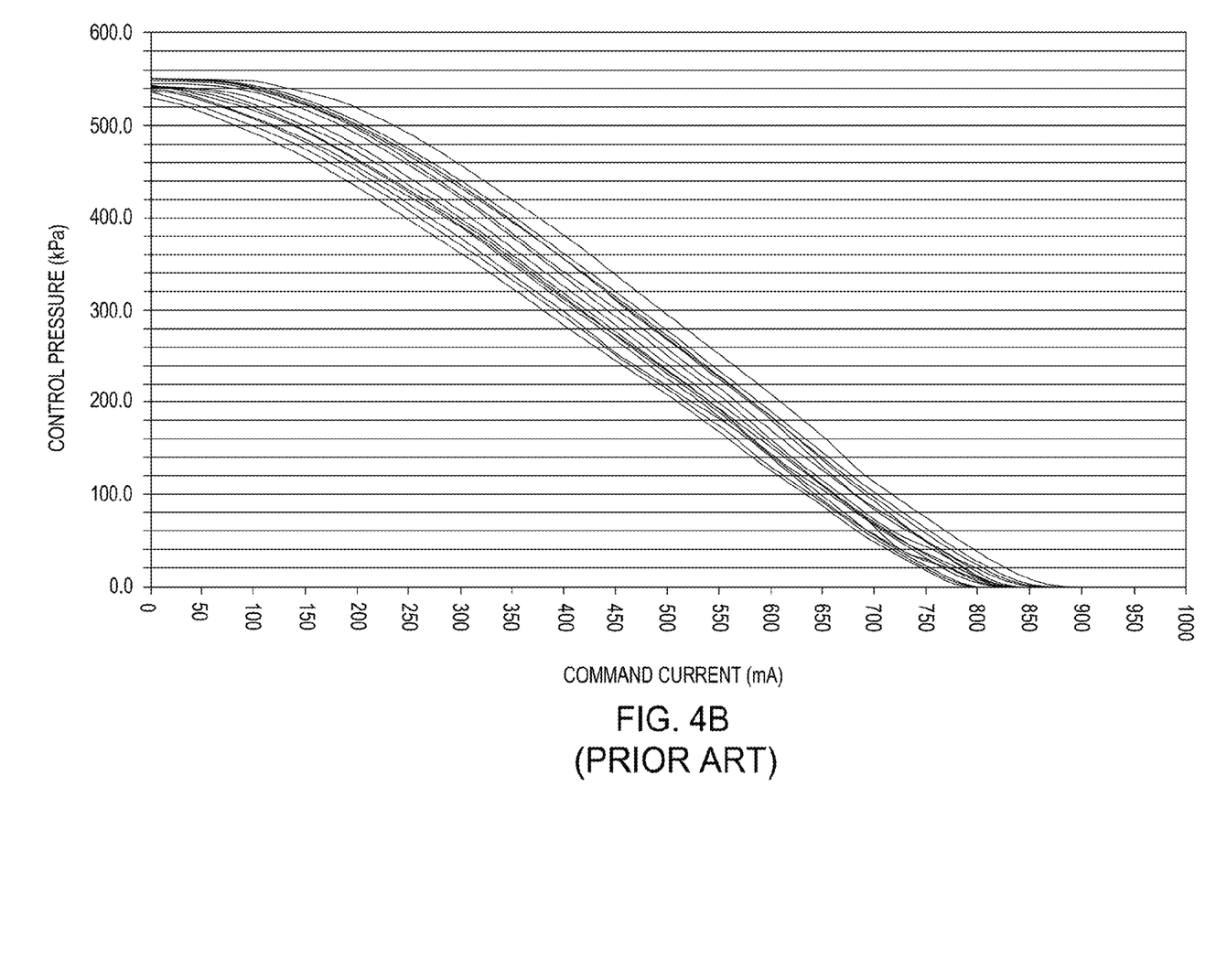
FIG. 4B is a representative plot of control pressure versus command current for a typical normally high solenoid.

Similarly, FIG. 4B is a representative plot of control pressure versus command current for a typical normally high solenoid. Each line represents the pressure curve of the armature at a given command current for the solenoid. At a representative current of 500 mA (0.5 A), the control pressure varies from about 250 kPa to about 300 kPa, for a variation in control pressure of approximately 50 kPa. In many applications, a variation of this magnitude is unacceptable.

Figure 5A:
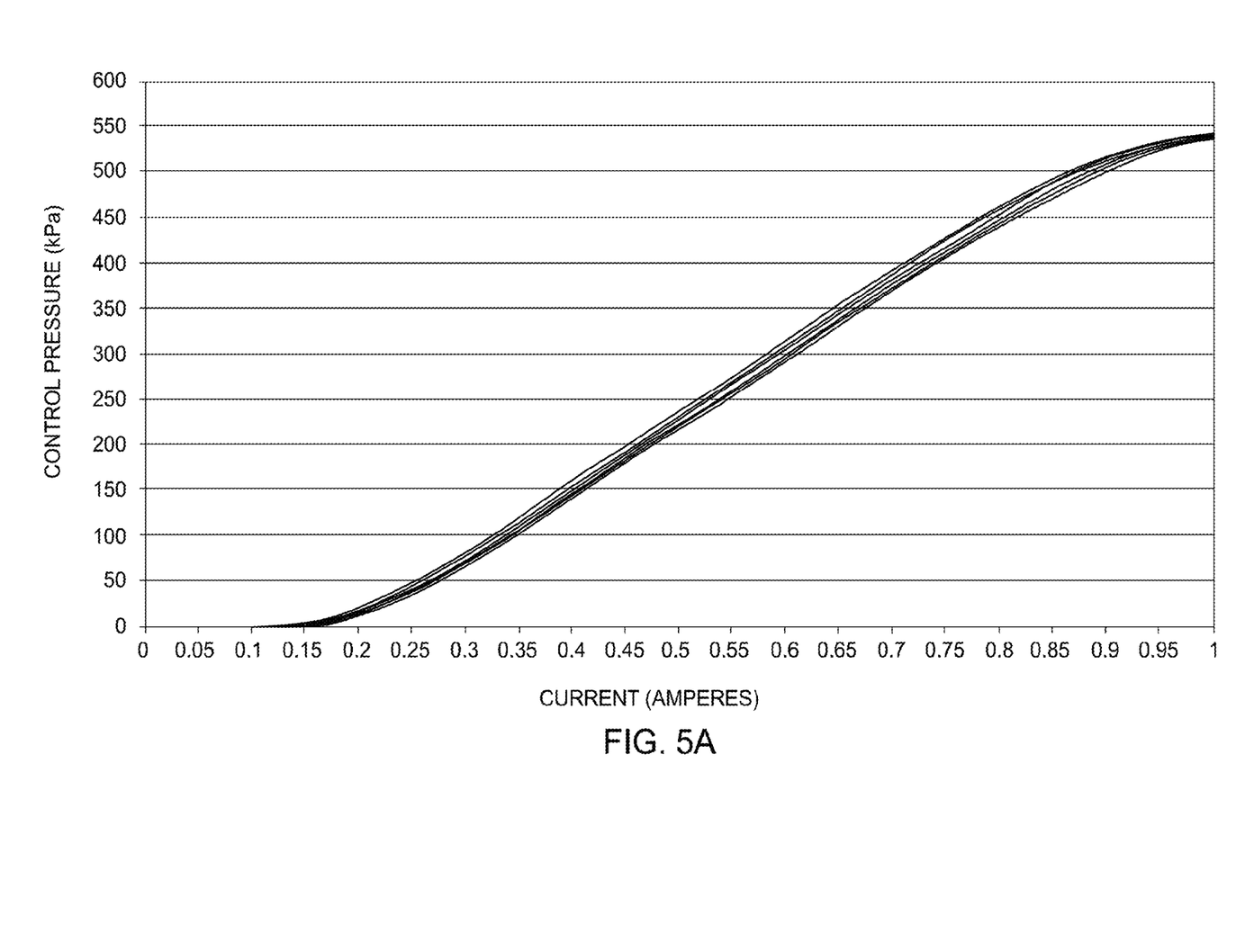
FIG. 5A is a representative plot of control pressure versus command current for a normally low solenoid in accordance with an embodiment of the present invention.

FIG. 5A is a representative plot of control pressure versus command current for a presently disclosed normally low solenoid, with each line representing the pressure curve of the armature at a given command current for the inventive solenoid. At a representative current of 0.5 A, the variation in control pressure is approximately 12 kPa.

Figure 5B:
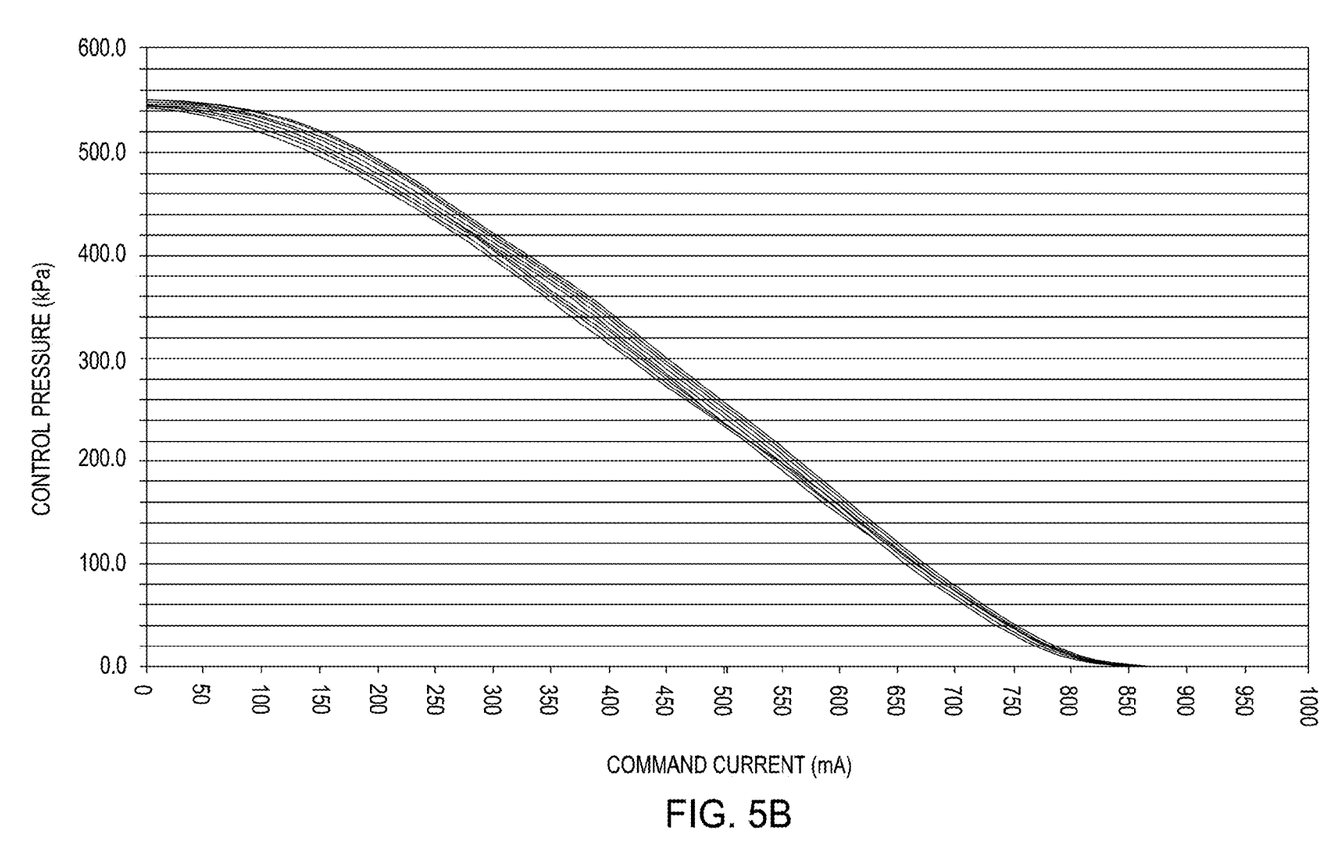
FIG. 5B is a representative plot of control pressure versus command current for a normally high solenoid in accordance with an embodiment of the present invention.

Similarly, FIG. 5B is a representative plot of control pressure versus command current for a presently disclosed normally high solenoid, with each line representing the pressure curve of the armature at a given command current for the inventive solenoid. At a representative current of 500 mA (0.5 A), the variation in control pressure is approximately 25 kPa.

The inventors have noted that the variation in control pressure at any current is significantly less in the currently disclosed solenoid and have attributed the reduced variation to the constant air gap 144, 244. As shown in FIGS. 1 and 2, the air gap 144, 244 remains constant which beneficially results in a more constant flux efficiency. The strength of the magnetic flux field directly affects the force with which the armature is displaced. The magnetic flux and the magnetic efficiency in the inventive solenoid are more uniform than in known solenoids, regardless of the armature position, because the air gap remains uniform. Accordingly, the magnetic force applied to the armature is more uniform and the control pressure has a correspondingly reduced variation.

The inventors have also observed that the Y-intercept of the control pressure versus command current plot can be predictably controlled by modifying the compressive preload of the resilient member 180. The Y-intercept, sometimes known as bias, may represent the maximum control pressure at full current for a normally low solenoid, or the maximum control pressure at zero current for a normally high solenoid. Conveniently, in the presently discloses solenoid, the bias can be adjusted after the solenoid is fully assembled and the manufacturing tolerances are fully known.

Once assembled, the solenoid can be calibrated to provide the desired bias. This can be achieved by permanently deforming the closed bottom 174, 274 in the area of the spring retainer 178, 278 for normally low or normally high solenoids, respectively. This may be seen in the enlarged view of the armature flange 114 and ring magnet 134 in FIG. 1A. A similar configuration is found in the normally high solenoid of FIG. 2.

The spring retainer 178, 278 is intentionally under deflected when assembled to provide bias adjustment after assembly. Deflecting the spring retainer 178, 278 increases the preload on the resilient member 180. The increased preload in resilient member 180 forces the armature flange 118 to be displaced upward (as drawn), changing the position of the disk flange in the magnetic field of the ring magnet 134, 234. This affects the disk-to-magnet (DTM) dimension 180 (FIG. 1A), the perpendicular distance between the planar ledge 146 of a retainer 148 and the planar bottom face 124 of the armature flange 118. Consequently, the magnetic force exerted by the ring magnet 134 on the armature flange 118 is modified, affecting the force applied by the armature 114 when the coil is energized (for normally low solenoids) or the force applied by the armature when the coil is de-magnetized (normally high solenoids). The area of the spring retainer 148 can be permanently deformed to a specified dimension that corresponds to the desired DTM after the solenoid is assembled.

Placement of the pin 132 within the bore 130 can be axially adjusted for specific applications.

Thus an electromagnetic solenoid is provided herein. The disclosed solenoid may advantageously reduce control pressure variation at a constant command current by providing a uniform air gap between the armature and a ring magnet. In some aspects of the disclosed solenoid, the output force can be adjusted easily during the manufacturing process, and may therefore reduce rejects in manufacturing and the associated remediation or scrap cost. The inventive solenoid eliminates the need for a stationary core (pole piece) and thus may reduce the size of the solenoid.

What is claimed is:
1. An electromagnetic solenoid comprising:
a coil for generating a magnetic force when energized with an electric current;
a bobbin having a tubular center section and a first end flange and a second end flange between which the coil is wound;
an armature having an armature flange at a first end integrally formed to a reduced diameter portion of the first end of the armature, the armature disposed at least partially within an interior portion of the tubular center section and supported for axial displacement between a first position and a second position;
a permanent ring magnet disposed at the first end flange of the bobbin with an inner radial face radially spaced apart from an outer radial face of the armature flange by a radial gap, the permanent ring magnet supported by a retainer adjacent to the first end flange of the bobbin and fixed against axial displacement with respect to the bobbin, wherein the retainer is contained entirely within an outer case;
the outer case having a closed bottom at a first end and an open top at a second end, wherein a spring retainer is formed centrally in the closed bottom of the outer case;
a flux washer disposed in the open top adjacent to a second end of the armature;
a coil liner having a stepped tubular construction with an upper portion disposed between the tubular center section of the bobbin and the armature and with a lower portion radially larger than the upper portion with a lateral surface abutting a lateral portion of the first end flange of the bobbin and a lower portion sized to rest upon a top surface of an outer edge of a positioning disk spring; and
the positioning disk spring having an inner circumferential edge defining a passage sized and shaped to receive a portion of the first end of the armature having reduced diameter, the inner circumferential edge coupled to the first end of the armature and an outer edge supported by an upper surface of the permanent magnetic ring and abutting a portion of the first end flange of the bobbin, wherein
the positioning disc spring is secured in place against axial or radial displacement with respect to the armature by the armature flange integrally formed to the first end of the armature having reduced diameter;
the retainer, the first end flange of the bobbin the permanent ring magnet and the coil liner cooperate to fix a position of the positioning disk spring radially while allowing axial deflection of the inner circumferential edge of the disk spring in response to axial displace- ment of the armature and cooperate to maintain alignment of an axis of the armature with an axis of the permanent ring magnet;

and the positioning disk spring positions the armature to maintain the dimension of the radial gap uniform as the armature is displaced from the first position to the second position.

2. The solenoid of claim 1, wherein the first position corresponds to a first electric current and the second position corresponds to a second electric current.

3. The solenoid of claim 2, wherein the first current is a zero ampere current and the second current is a non-zero ampere current.

4. The solenoid of claim 1, wherein an armature disk coupled to the first end of the armature forms the armature flange.

5. The solenoid of claim 1, wherein the permanent ring magnet is axially magnetized.

6. The solenoid of claim 5, wherein a portion of the flux path of the permanent ring magnet passes through the armature flange.

7. The solenoid of claim 5, wherein a planar bottom surface of the permanent ring magnet rests upon and is supported by a planar upper surface of the retainer.

8. The solenoid of claim 1, wherein the coil liner comprises a first end axially fixed by the permanent ring magnet and a second end axially fixed by the flux washer.

9. The solenoid of claim 8, further comprising a plurality of malleable tabs formed at the first end of the outer case that when shaped engage the flux washer and axially compress the coil liner.

10. The solenoid of claim 1, further comprising a resilient member disposed between the first end of the armature and the spring retainer formed in the closed bottom of the outer case.

* * * * *